(12) United States Patent
Mangiaforte

(10) Patent No.: US 6,179,888 B1
(45) Date of Patent: Jan. 30, 2001

(54) HYBRID FILTER BAG ASSEMBLY

(75) Inventor: Robert J. Mangiaforte, Hanover Park, IL (US)

(73) Assignee: Filtration Group, Incorporated, Joliet, IL (US)

( * ) Notice: Under 35 U.S.C. 154(b), the term of this patent shall be extended for 0 days.

(21) Appl. No.: 09/344,191

(22) Filed: Jun. 24, 1999

(51) Int. Cl.[7] ................................................. B01D 46/02
(52) U.S. Cl. ............................ 55/341.1; 55/376; 55/377; 55/378; 55/379
(58) Field of Search ................................ 55/341.1, 374, 55/376, 377, 378, 379

(56) References Cited

U.S. PATENT DOCUMENTS

| 3,937,621 | 2/1976 | Gravley . | |
|---|---|---|---|
| 4,073,632 | 2/1978 | Reinauer et al. . | |
| 4,138,234 | 2/1979 | Kubesa . | |
| 4,244,718 | * 1/1981 | Noddin ................................... | 55/377 |
| 4,278,454 | 7/1981 | Nemesi . | |
| 4,436,536 | 3/1984 | Robinson . | |
| 4,443,237 | * 4/1984 | Ulvestad ................................ | 55/379 |
| 4,648,889 | * 3/1987 | Jensen ................................... | 55/378 |
| 4,882,056 | 11/1989 | Degen et al. . | |
| 5,039,413 | 8/1991 | Harwood et al. . | |
| 5,066,318 | 11/1991 | McDonough . | |
| 5,112,372 | 5/1992 | Boeckermann et al. . | |
| 5,308,369 | 5/1994 | Morton et al. . | |
| 5,308,485 | * 5/1994 | Griffin et al. ......................... | 210/232 |
| 5,536,290 | 7/1996 | Stark et al. . | |
| 5,632,791 | 5/1997 | Oussoren et al. . | |
| 5,730,766 | 3/1998 | Clements . | |
| 5,736,045 | 4/1998 | Bies et al. . | |
| 5,904,743 | * 5/1999 | Jensen ................................... | 55/341.1 |

* cited by examiner

Primary Examiner—David A. Simmons
Assistant Examiner—Betsey Morrison Hoey
(74) Attorney, Agent, or Firm—Vedder, Price, Kaufman & Kammholz

(57) ABSTRACT

A filter bag assembly of hybrid construction is disclosed that reduces the height of the filter bag assembly as well as its overall cost. The assembly indicates an elongated filter body portion, an end cap closing at one end of the filter body, a collar disposed at the other end of the filter body. The collar is molded onto the filter body and an inner venturi portion molded therewith. The assembly also includes a fabric extension portion that is attached to the interior of the collar. This extension may have a diameter greater than that of the collar so as to permit the filter body to be used in a tubesheet opening that is usually larger than that of the collar diameter. A snap band is contained within the collar for retaining the assembly in a tubesheet opening.

25 Claims, 3 Drawing Sheets

HYBRID FILTER BAG ASSEMBLY

BACKGROUND OF INVENTION

The present invention relates generally to the construction of filter bags used in fabric-type dust and particulate collection, and more particularly, to an improved filter bag construction of hybrid construction.

Stringent environmental controls on industrial emissions virtually require many industries to remove particulate matter from dust-laden air and gas streams before the air and gas streams are exhausted into the atmosphere. This removal is typically done by filtration and involves passing the gas, or airstream, through a fabric filter. This filtration is typically accomplished in what is known as a "baghouse" or "dust collector" which is an enclosed area having what is known as a tubesheet with one or more openings formed therein that receive and support elongated filter "bags" that are made of a filter fabric.

The air, or gas stream, is forced into the baghouse where it passes through the filter bags, trapping the particulate matter in the air stream on the bag's surface so as to collect the particulate matter. The filtered air may then be exhausted to the atmosphere or used in another industrial application. After a predetermined time of operation, the particulate matter has accumulated on the filter bags and the bags need to be cleaned.

This cleaning may be accomplished by mechanically shaking the filter bags to dislodge the accumulated particulate matter. Cleaning may also be accomplished by reversing the flow of the air or gas stream which passes through the bag in order to dislodge the accumulated particulate matter. Cleaning may still further be effected by using a pulsed jet of air that is forced through the filter fabric. All of this type of cleaning, as well as the normal operation of the baghouse, subjects the filter fabric of the bags to repeated stretching which eventually may result in the deterioration of the filter bags. The filter bags must be checked periodically and manually replaced at intervals.

Filter bags used in baghouses may be classified into two different types of construction. In the first type of construction, the filter bag is formed from a filter fabric and is stretched over an internal metal cage that supports the bag within the tubesheet opening. A metal collar assembly is required to hold the filter bag and the support cage together and to provide the combined assembly with a flange that engages the tubesheet. U.S. Pat. No. 4,138,234, issued Feb. 6, 1979, describes such a filter bag construction.

As shown in this '234 patent, it can be seen that the metal wire support cage is position inside the filter bag and extends for the entire length. The wire support cage is attached to a collar that has an annular gasket supported thereon. A metal venturi may be also attached to the collar and extend part way into the bag to provide for a smooth transition of the air or gas stream when entering the bag. Certain problems are inherent with this type of filter bag construction. For example, the metal cages are prone to wear out. The metal support cage causes the overall bag assembly to have a rather heavy weight that renders its replacement and removal difficult and requires increased labor. Additionally, the metal support assembly is composed of multiple parts that must be assembled prior to insertion of the filter bag assembly into the baghouse. This assembly requires labor and these parts must also be checked during service and maintenance intervals. This increases the labor cost associated with assembling and servicing these filter bags.

Another type of filter bag assembly construction is described in U.S. Pat. No. 5,632,791, issued May 27, 1997. In this type of construction, a pleated filter bag is used and is supported by an internal plastic support cage. The internal support and the bag are attached to a pliable plastic cap, or annular header portion, that is formed of polyurethane or the like. The polyurethane header member may often be molded, or potted, directly to the filter bag. This header member is formed with a diameter that is slightly less than the diameter of the tubesheet opening. However, this filter bag construction is costly, because each such filter bag assembly has an individual mold for the header member having a specific diameter that matches the tubesheet opening size. This increases the overall cost of the filter bag assemblies in that the cost for each size mold must be considered. Additionally, when the header member is molded to the top end of the pleated filter media, an inadequate seal may result from the molding under elevated temperature operation that would create an opening between the two members through which air or gas could bypass the filter fabric. Still further, the molded header member may tear or rip during installation or removal and may lose strength due to high temperature conditions.

Still further, other filter bag constructions in the prior art utilize a filter bag with a molded header member in consideration with a metal snap band on the inside diameter of the header member. This snap band serves to secure the bag assembly to the tubesheet opening. This snap band must be removed when the filter bag assembly is installed and removed. This is an extra step that increases the labor cost of installation and removal.

The present invention is accordingly directed to an improved filter bag assembly of hybrid material construction that avoids the aforementioned shortcomings.

SUMMARY OF THE INVENTION

It is therefore an object of the present invention to provide a filter bag assembly with an improved construction that is simpler and less expensive to manufacture.

Another object of the present invention is to provide a filter bag assembly for use in industrial applications such as in baghouse and tubesheets wherein that has a construction that is easy for installation and removal.

A still further object of the present invention is to provide a filter bag assembly construction wherein the filter bag assembly includes an internal plastic core to support an outer filter fabric in the form of a bag, the outer filter fabric having a polymer collar molded thereto and having a fabric extension in the form of a collar attached to the collar and extending upwardly therefrom, the extension incorporating a snap band therein in retaining the filter bag assembly in place within a tubesheet opening.

Yet another object of the present invention is to provide a filter bag assembly of hybrid construction, the filter bag assembly having an elongated fabric filter body, the filter body having a collar portion attached thereto and defining an exist passage from the interior of the filter body, the assembly further including a flexible, extension portion extending from the collar portion and being formed from a different material from that of the collar portion, the extension portion having a diameter larger than that of the collar portion so that by varying the diameter of the flexible extension portion, a number of filter bag assemblies may be formed having the same sized collar portions but capable of fitting different size tubesheet openings.

A further object of the present invention is to provide an improved filter bag assembly for use in a baghouse wherein the filter bag assembly includes an elongated filter body, a collar portion forming one end of the bag assembly and defining a passage into the interior of the filter body, the assembly further having a fabric extension portion attached to the collar portion and aligned with the filter body portion, the extension portion forming an extension of the collar portion passage and having a diameter greater than the collar portion diameter, the extension portion further including a plurality of bag assembly handling members forward from a fabric and disposed within the extension portion passage.

In accordance with the aforementioned objects, the present invention accomplishes these objects by way of a unique construction in which the filter body portion has an endcap and a collar portion molded to opposite ends. The collar portion has a given diameter that approximately matches that of the filter body. An extension portion is formed from a flexible material different than that of the collar portion and is attached to an open end of the collar portion. The extension portion thus further defines the passage into and out of the interior of the filter body. The extension portion is flexible so that the filter bag assembly so formed has the ability to fit different diameter openings in the tubesheet with only one size of collar portion.

In another aspect of the present invention, the extension portion includes a flexible snap band enclosed in an annular pocket formed between two opposing folds of the fabric. A gasket may be positioned adjacent to the snap band to provide the extension portion with a resilient snap band cuff that provides an effective seal for the bag assembly. Because the extension is fabric, it is unaffected by high operational temperatures of the baghouse that normally affect plastic seals used on other pleated filter bags.

These and other objects, features the advantages of the present invention will be clearly understood through consideration of the following detailed description.

BRIEF DESCRIPTION OF THE DRAWINGS

In the course of this description, reference will be made to the attached drawings in which.

DETAILED DESCRIPTION OF THE PREFERRED EMBODIMENTS

Figure 1:
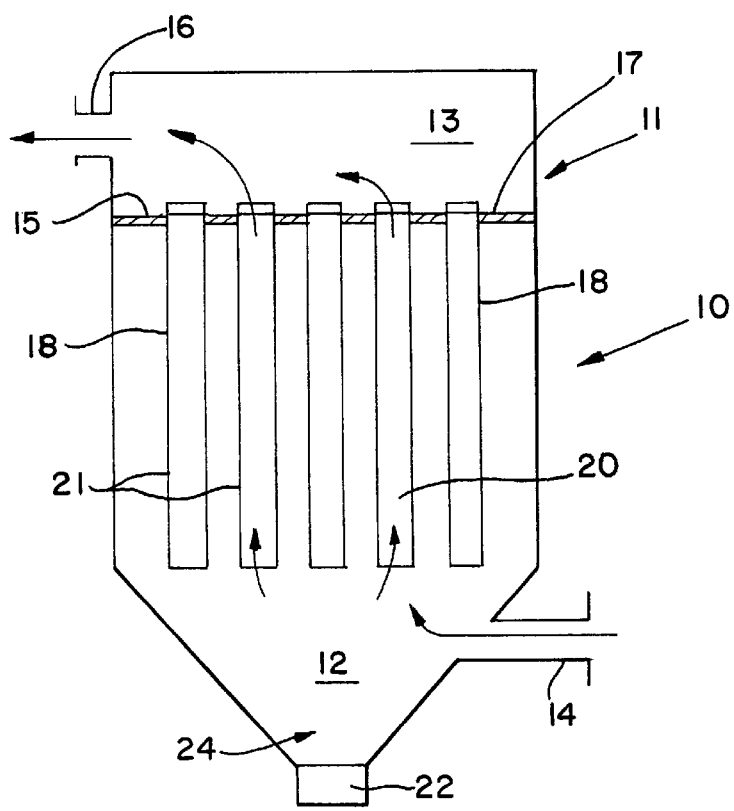
FIG. 1 is a schematic view of a baghouse environment in which the present invention finds its greatest utility.

FIG. 1 schematically illustrates what is known in the art as "baghouse" 10 and may often also be referred to as a dust collector. The baghouse 10 is an area in which dust, or other particulate matters is collected. The terms "dust," "particulates" and "particulate matter" are used in this description interchangeably to describe matter that is entrained in a gas stream. Similarly, the term "gas" is used in this description to refer to any gaseous stream, including an air stream which is to be cleaned of particulate matter.

The baghouse 10 is, in essence, a housing 11 having a tubesheet 15 that divides the housing into two separate plenums 12, 13. A gas stream containing particulates enters one of the plenums 12, commonly referred to as a "dirty air" plenum, by way of a port 14. The gas stream is cleaned in the baghouse and leaves it by way of an exhaust port 16 in the clean air plenum 13 of the housing 11.

The tubesheet 15 is typically a flat sheet of metal that has a series of openings 17 formed therein. Each such opening 17 supports a filter bag assembly 18. As explained in detail below, the filter bag assembly 18 has a filter media through which the gas stream is forced under pressure into the interior 20 of the bag assembly. The particulate matter entrained in the gas stream accumulates on the exterior surfaces 21 of the filter bag assemblies 18, while the "cleaned" gas stream enters the clean air plenum 13 and exits through its ports(s) 16.

The baghouse 10 may employ various means (not shown) to remove the particulate matter collected on the exterior 21 of the filter bag assemblies 18 that are well known in the art, such as by shaking the filter bag assemblies 18 by mechanical means, or by injecting high pressure air in pulses from within the clean air plenum. This high pressure air is a reverse air stream and it forces the particulate matter off of the exterior surfaces 21 of the filter bag assemblies 18. The dislodged particulate matter is often collected in a hopper 22 located at the base 24 of the baghouse 10 and removed from the baghouse 10.

Figure 2:
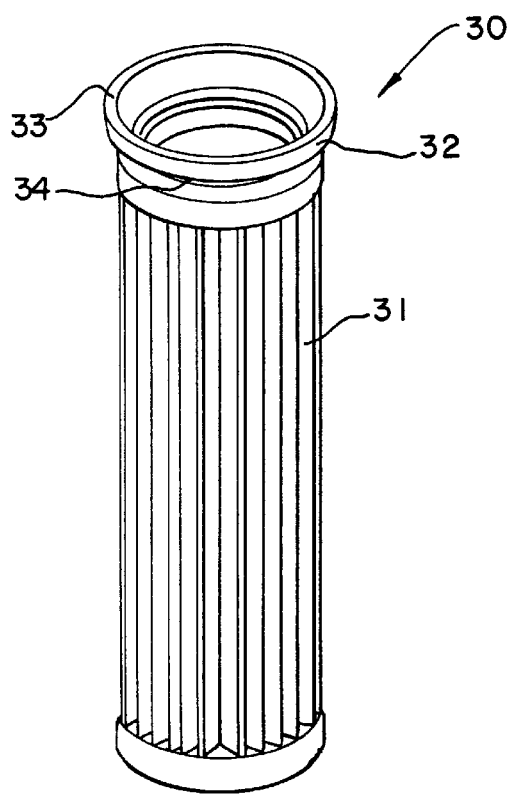
FIG. 2 is a perspective view of a known filter bag assembly having an integral collar portion molded to its exterior filter bag.

Turning now to FIG. 2, a known filter bag assembly is illustrated generally at 30 and is seen to include a pleated filter bag body portion 31 with a flexible top sleeve portion 32 that is attached to the fabric body portion 31. This style of filter bag assembly construction is described in detail in U.S. Pat. No. 6,632,791, issued May 27, 1991. Because the top sleeve portion 32 is molded directly to the fabric body portion 12, with a specific diameter D, a mold is required for each different size tubesheet opening, thereby increasing the cost of manufacture of the filter bag assemblies. In this type of filter bag construction, the top sleeve portion also includes a radial flange member 33 and a circumferential groove 34 that engage the tubesheet 15. Because these items are also molded with the top sleeve portion 32 they are formed from the same material, typically polyurethane. This material will soften under high operational temperature and compromise any seal capability it has.

Figure 3:
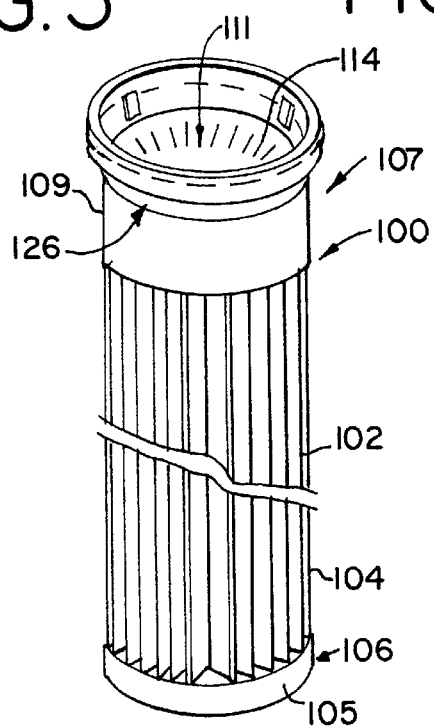
FIG. 3 is a perspective view of a filter bag assembly constructed in accordance with the principles of the present invention.
Figure 4:
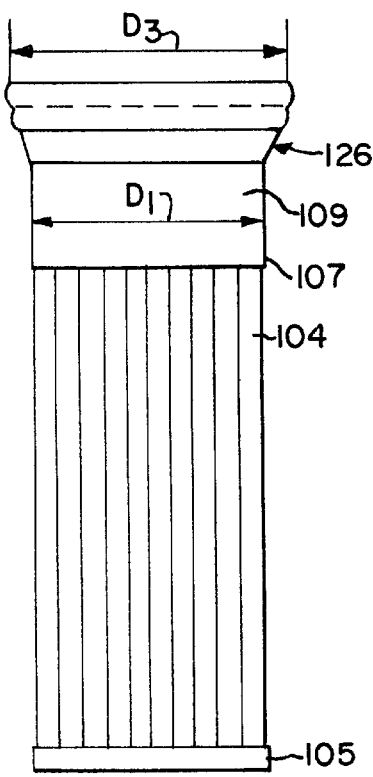
FIG. 4 is an elevational view of the filter bag assembly with FIG. 3.

FIG. 3 shows a filter bag assembly 100 constructed in accordance with the principles of the present invention. The filter bag assembly 100 has an elongated body portion 102 formed from a filter fabric 104, that is preferably pleated so as to increase the surface area of the filter bag assembly 100. The filter fabric 104 is formed as a continuous ring of a predetermined length. A bottom cap portion 105 is dispersed at one end, the bottom end 106 of the body portion 102 and closes off the filter fabric ring so that the fabric ring is open only at the top end 107 of the body portion 102. It is preferred to use a spun-bonded, polyester-plated filter media as the filter fabric that give a means of reliability. Other suitable medias may include polypropylene, aramid fibers, PPS fibers, fiberglass or acrylics.

A collar portion 109 is disposed at the top end 107 of the body portion 102 and provides a solid anchoring effect to hold the filter fabric in its elongated, tube-like shape. The collar portion 109 is preferably formed from a polymeric or resinous material, such as polyurethane.

Figure 5:
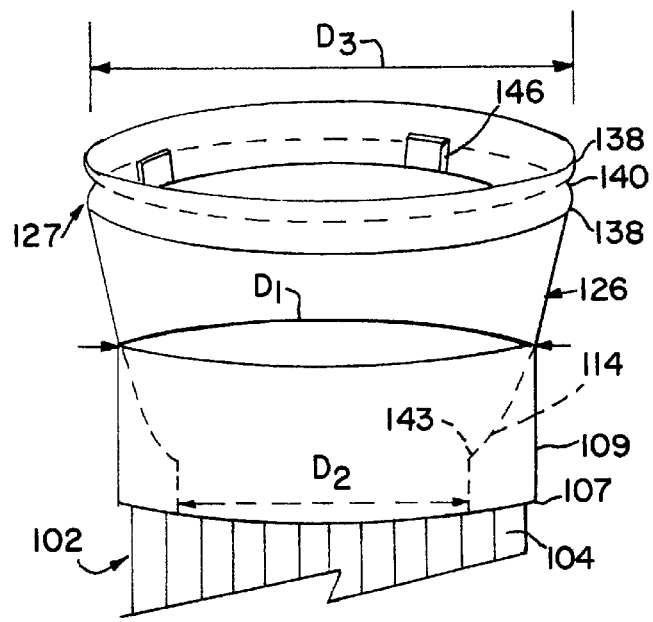
FIG. 5 is an enlarged view of the top portion of the filter bag assembly of FIG. 2.
Figure 6:
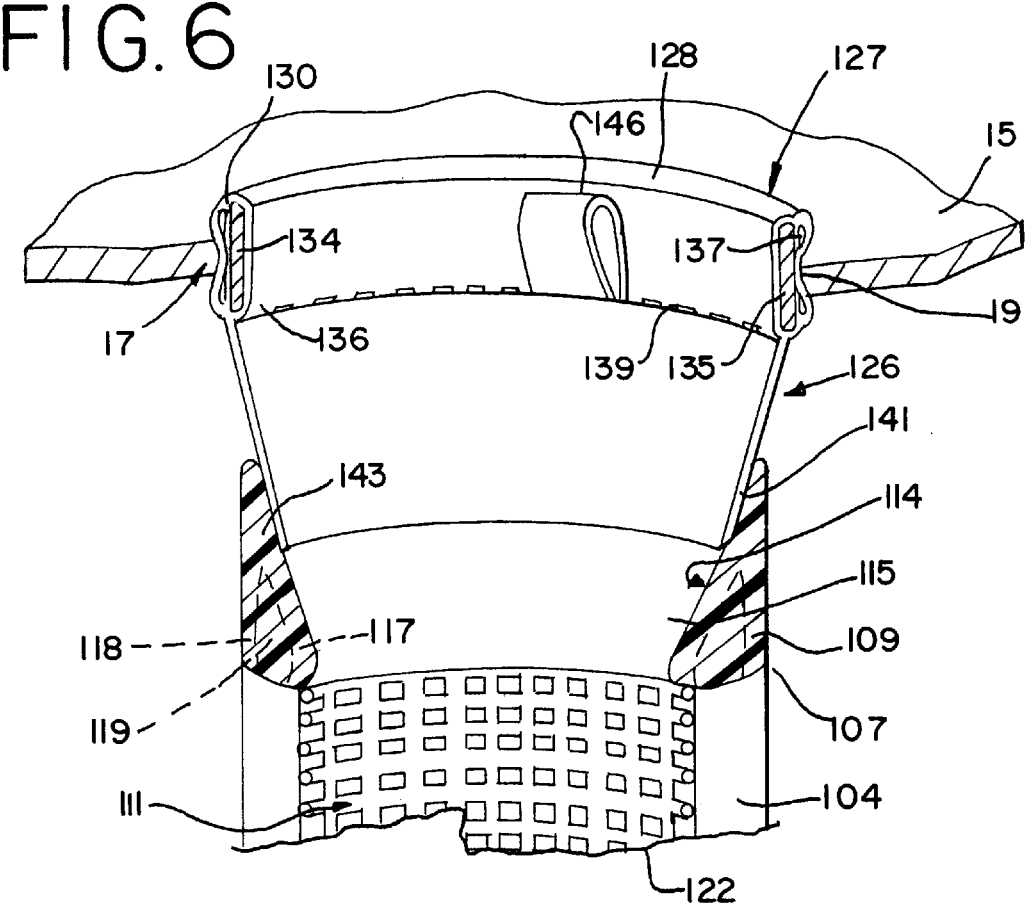
FIG. 6 is a partial sectional view of the top portion of the filter bag assembly of FIG. 2; and, FIG. 7 is an enlarged, detailed sectional view of the top end of the filter bag assembly of FIG. 5.

The collar portion has a first diameter $D_1$, that is slightly less than or equal to, the diameter of the tubesheet openings 17. This collar portion 109 may be separately formed, such as by injection or other molding, and subsequently attached to the filter fabric 104. Alternatively, it may be adhered directly to the filter fabric 104 by molding it onto the top end 107 of the filter body portion 102. In order to facilitate the passage of the gas stream from the interior portion 111 of the filter bag assembly 100 into the clean air plenums 13, the collar portion 109 may have an internal tapered portion 114, to provide a venturi-type passage 115 for the cleaned gas stream. The venturi 115 may be formed as shown in FIGS. 5 & 6 where the reduced diameter $D_2$ is aligned with the bottom end of the collar portion 109 (i.e., as a solid portion of the collar portion 109), or it may be formed as a flap 117 that extends inwardly and downwardly from the sidewall 118 of the collar portion 109. This flap 117 is shown in FIG. 6 in phantom and will be spaced apart from the collar portion sidewall 118 by an intervening space 119.

The present invention contemplates the venturi 115 as being formed integrally with the collar portion 109. This one-piece structure eliminates the need for multiple parts, such as the separate venturi shown in the prior art, that had to be assembled from multiple pieces prior to insertion of the filter bag assembly into the tubesheet opening. The collar portion 109 is also preferably attached to an inner core member 122. This inner core member 122, as identified in FIG. 6, is a hollow tube of meshed, or open grid material, such as a molded polypropylene. This inner core member 122 extends for almost the entire length of the filter bag assembly body portion 102 and provides a measure of support for the filter fabric 104.

The filter bag assembly 100 further includes an extension portion 126 that serves to facilitate the placement and retention of the filter bag assembly 100 in the tubesheet 17. As shown in FIG. 5, this extension portion 126 rises above the collar portion 109 in a predetermined extent and may, as illustrated, extend radially outwardly such that, as shown, it may present a different configuration than that of the collar portion 109. The collar portion 109 is generally cylindrical, while the extension portion is somewhat conical. As such, the extension portion 126 has a diameter $D_3$ that is greater than the first diameter $D_1$ of the collar portion 109. Although significant advantages are obtained from the filter bag assembly 100 where the diameter $D_3$ of the extension portion 126 is larger than the diameter $D_1$ of the collar portion 109, similar benefits are obtained when the extension portion 126 and collar portion 109 have the same diameter. Accordingly, it is to be understood that the size of the extension portion may vary and is not limited to a size greater than that of the collar portion 109 and its configuration may be generally cylindrical and match that of the collar portion 109.

Figure 7:
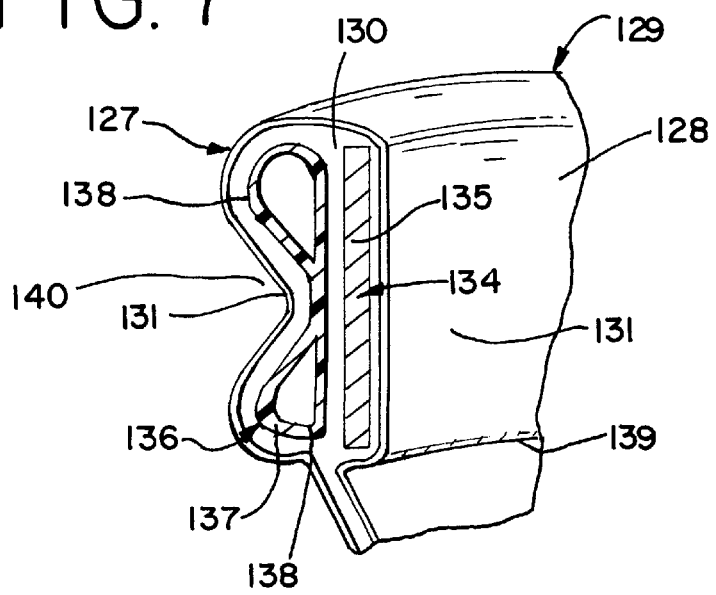

This extension portion 126 importantly includes means for engaging the tubesheet openings 17 shown as a snap band cuff portion 127. This cuff portion 127 is preferably formed from a durable fabric 128, such as a felt. The fabric 128 is preferably formed as a continuous strip 129 of fabric in the form of a ring that is folded upon itself to define an interior pocket 130 between the folds 131 of the fabric 128. (FIGS. 6 & 7.)

A resilient spring member 134, typically a steel band 135, formed from a suitable spring steel is located within this pocket 130. This structure is best illustrated in FIG. 7 where it can be seen that a resilient seal member 136, such as the double-beaded gasket 137 shown, is disposed adjacent to the spring member 134. The spring member 134, as is shown in the art, provides a radial sealing force and resilience to the snap band collar portion 127. This spring member 134 may be deflected, or distorted, by squeezing it together into an oval or "kidney bean" configuration as is known in the art, in order to reduce its diameter so that it may be easily inserted into the tubesheet openings 17. When released, the spring member 134 resumes its original diameter and will serve to produce a radical outward retention force that acts against the inner edge 19 of the tubesheet opening 17.

The seal member 136 is preferably a double-beaded gasket 137 that is formed from a resilient material that deflects to a desired degree in order to form a reliable seal on the opposite sides of the tubesheet 15. The gasket 137 has two enlarged portions 138 that form a rim 140 therebetween. The enlarged portions 138 fit, as shown in FIG. 6 on opposite sides of the tubesheet 15 while the rim 140 engages the inner edge 19 of the tubesheet opening 17. The seal member 136 may be molded, or otherwise formed, from a ring of rubber, neoprene, silicone, or other similar material that is pliable enough to flex when the snap band spring member 134 is deflected and when it rebounds into its original shape. This gasket 137 protects against gas stream leakage at the interface between the tubesheet openings 17 and filter bag assemblies 100.

Both the gasket 136 and the spring member 134 are contained within the pocket 130 formed between the folds 131 of the cuff 127. The folds 131 may be stitched together along a stitch line 139 in order to close off the pocket 130 and to retain the members 134, 136 in place at the top part of the extension portion 126. The fabric 128 extends down into the interior of the collar portion 109 and into the passage of the collar portion and is further preferably attached to the interior of the collar portion 109 along an inner rim 141 that lies above and adjacent the venturi 115 as best illustrated in FIG. 6.

As mentioned earlier, the extension portion 126 has a larger diameter than that of the collar portion 109. This, coupled with the inherent flexibility of the snap band spring member 134, permits the filter bag assembly 100 of the present invention to be economically made to fit various diameter tubesheet openings 17. In the prior art, the molded collar portion 109 would be equipped with a sealing flange formed therewith so that a mold was required for each different diameter tubesheet opening. With the present invention, the collar portion 109 may be formed with the fabric body potion 102 in a single size to fit within the smallest working tubesheet opening 17, while the fabric cuff 127 may be made to meet the actual tubesheet opening diameter to accommodate a range of larger size tubesheet openings 117. Thus, only one mold is normally required in the manufacture of such filter bag assemblies 100, thereby saving on the manufacturing costs of the filter bag assemblies 100. The extension portion 126 may be pre-made in select sizes and subsequently attached to chosen collar portions 109.

Additionally, because the snap band cuff 127 is formed from a fabric, it eliminates the possibility of bypass leaks from occurring between the tubesheet opening 17 and the sleeve portions of the prior art filter bag assemblies shown in FIG. 2. In those known assemblies, the sleeve portion was typically formed from a polyurethane that has the tendency to become soft at elevated temperatures and thereby weaken the seal between the sleeve portion and the tubesheet. In the present invention, the extension portion 126 that contacts the tubesheet openings 17 is formed of a fabric with a spring member 134 that will not suffer any degradation in its resiliency with temperature. Thus, higher operational temperatures of the baghouse 10 may be attained.

The extension portion 126 may be attached to the collar portion 109 such as by the use of adhesives, or by stitching. It may also be attached thereto by a molding process, such as insert molding the collar portion 109 around the lower part of the extension portion 126. In this regard, the bottom edges 143 of the folds 131 may actually be embedded in the body of the collar portion 109 as shown in FIG. 6. The outward taper of the extension portion 126 that is used for insertion into the sheet openings 17 with diameters greater than that of the collar portion 109 eliminates the need for special tooling and specialized adapter kits for insertion into all different sized tubesheet openings 17.

It is common with prior art filter bag assemblies to provide some form of handle for use in the removal of the filter bag assembly from the tubesheet 15. For the most part, these handles are formed as a bent metal loop attached to opposing ends of the collar portion of the filter bag assembly. Such handles may break off or fall off during the filter bag assembly removal and installation. The present invention overcomes this problem. It incorporates a series of fabric loops or tubes 146 in the extension portion 126. These loops 146 are located in the interior of the extension portion 126 and thus will preferably not extend above or outside of the top end of the filter bag assemblies 100, and particularly the extension portion 126 where they might be contacted by something that would cause them to separate from the filter bag assembly 100. These loops 146 will facilitate the insertion and removal of the filter bag assemblies 100 from the tubesheets 15.

It will be appreciated that the extension portion 126 reduces the overall cost of manufacture of the filter bag assemblies 100, but also because of its largely fabric nature, it reduces the overall weight of the filter bag assembly 100 which makes it lighter and reduces any fatigue of the installation and removal personnel. Additionally, the snap band is integrated into the bag assembly construction and does not require a separate band that must be installed and removed.

While the preferred embodiment of the invention have been shown and described, it will be apparent to those skilled in the art that changes and modifications may be made therein without departing from the spirit of the invention, the scope of which is defined by the appended claims.

I claim:

1. A filter bag assembly for use in a baghouse, the filter bag assembly being adapted for fitting within an opening of a tubesheet, said filter bag assembly further providing filtration of a gas stream that is passed from one side of the tubesheet to the other side of said tubesheet, the opening having a predetermined diameter, comprising:

an elongated tube of a permeable filter media having opposing first and second ends and a hollow interior portion;

a base portion disposed at the filter tube first end closing said filter tube first end and forming a base of said filter bag assembly;

a hollow collar portion formed from a preselected material, the collar portion being disposed at said second end of said filter tube and forming a filter bag assembly passage communicating with the filter tube interior portion, said collar portion having an outer diameter that is approximately equal to an outer diameter of said filter tube, said collar portion outer diameter being less than said tubesheet opening predetermined diameter so that said filter tube and said collar portion may be inserted into and removed from said tubesheet opening; and, a hollow extension portion formed from a material that is different from said collar portion material, the extension portion being attached to said collar portion and extending upwardly away from said collar portion, said extension portion defining an extension of said filter bag assembly passage, said extension portion further including a snap band enclosed therein for engaging said tubesheet when said filter bag assembly is inserted into said tubesheet opening, said extension portion further including a seal portion disposed at an end thereof for providing a seal between said tubesheet opening and said filter bag assembly.

2. The filter bag assembly as set forth in claim 1, wherein said extension portion is formed from a fabric sleeve folded upon itself to define an interior pocket within said extension portion, the fabric sleeve interior pocket enclosing said snap band and maintaining said snap band in a predetermined location proximate to an edge of said extension portion.

3. The filter bag assembly as set forth in claim 2, wherein said seal portion includes an annular gasket member also enclosed within said fabric sleeve interior pocket.

4. The filter bag assembly as set forth in claim 2, further including at least two fabric tab members attached to said extension portion for facilitating removal of said filter bag assembly from said tubesheet opening.

5. The filter bag assembly as set forth in claim 2, further including an inner core member supporting said filter media.

6. The filter bag assembly as set forth in claim 1, wherein said extension portion is formed from a fabric sleeve folded upon itself to define an interior pocket within said extension portion, the fabric sleeve interior pocket enclosing said snap band and maintaining said snap band in a predetermined location proximate to an edge of said extension portion, said seal portion including an annular gasket member disposed adjacent to said snap band, and said fabric sleeve interior pocket further enclosing said gasket member in said fabric sleeve interior pocket.

7. The filter bag assembly as set forth in claim 1, wherein said collar portion includes a tapered portion formed therewith, the tapered portion defining an inner diameter of said collar portion that is less than said collar portion outer diameter.

8. The filter bag assembly as set forth in claim 7, wherein said tapered portion includes a venturi integrally formed with said collar portion and the venturi having an inner diameter that is less than said collar portion outer diameter, said venturi communicating with said filter tube interior portion.

9. The filter bag assembly as set forth in claim 1, wherein said snap band includes a ring of spring steel and said extension portion includes at least one flexible handle member attached to the interior of said extension portion for facilitating removal of said filter bag assembly from said tubesheet opening.

10. The filter bag assembly as set forth in claim 1, wherein said extension portion has an outer diameter that is greater than said collar portion outer diameter.

11. The filter bag assembly as set forth in claim 1, wherein said collar portion is formed from a polymer, and said extension portion is formed from a fabric, said extension portion and said collar portion being attached to each other within said filter bag assembly passage.

12. The filter bag assembly as set forth in claim 11, wherein said extension portion is attached to said collar portion by adhesive means.

13. The filter bag assembly as set forth in claim 11, wherein said extension portion is attached to said collar portion by insert molding.

14. The filter bag assembly as set forth in claim 11, wherein said extension portion and collar portion are attached together by molding.

15. The filter bag assembly as set forth in claim 1, wherein said extension portion is at least partially formed from at least two folds of fabric, the fabric including a spring member and a gasket member disposed within said folds, said extension portion having a lower end portion that extends into said filter bag assembly passage and which is attached to a corresponding opposing portion of said collar portion.

16. The filter bag assembly as set forth in claim 1, wherein said extension portion is formed from a fabric sleeve and at least one end of said fabric sleeve is attached to an interior surface of said collar portion.

17. The filter bag assembly as set forth in claim 16, wherein said fabric sleeve is formed from a felt sleeve and said felt sleeve is folded upon itself such that opposing free ends of said felt sleeve lie adjacent each other, and said felt sleeve adjacent free ends are attached to said collar portion interior surface.

18. A filter bag for removing particulate matter from an air stream, the filter bag having a composite construction and being adapted for insertion into an opening in a support member of an air cleaning device, said filter bag comprising:

an elongated, hollow filter tube having first and second ends, the filter tube being formed from a permeable filter material defining a hollow passage through which the air stream may pass, said filter tube including a base member disposed at the first end thereof and capping off said filter tube first end, said filter tube further including a molded, polymer collar attached to said filter tube second end, the collar partly defining a passage communicating with an interior portion of said filter tube, and a hollow, fabric cuff extending from said collar, the cuff including a flexible engagement band for engaging the support member opening, said cuff further being joined to said collar to define a unitary filter bag assembly.

19. A filter bag for removing particulate matter from an air stream, the filter bag having a composite construction and being adapted for insertion into an opening in a support member of an air cleaning device, said filter bag comprising:

an elongated filter tube with a hollow interior, the filter tube having first and second ends, said filter tube being formed from a permeable filter material defining a hollow passage through which the air stream may pass, said filter tube including a base member disposed at the first end thereof and capping off said filter tube first end, said filter tube further including a hollow collar formed from a polymer and attached to said filter tube second end, the collar partly having an inner passage communicating with an interior portion of said filter tube, and a hollow, fabric cuff extending from said collar, the cuff including a flexible engagement band for engaging the support member opening, said cuff defining an extension of said collar passage, said fabric cuff and polymer collar portion being joined together in a manner so as to define a unitary assembly.

20. The filter bag of claim 19, further including a hollow, support member disposed within said filter tube interior portion.

21. The filter bag of claim 19, wherein said fabric cuff is formed from a sheet of fabric that is folded upon itself so as to define an interior pocket between opposing folds of said fabric, the interior pocket being disposed at one end of said fabric cuff and said flexible band being disposed within said interior pocket.

22. The filter bag of claim 19, wherein said collar includes an internal venturi integrally formed therewith, the venturi reducing the diameter of said collar inner passage.

23. The filter bag of claim 22, wherein said fabric cuff is formed from a sheet of fabric that is folded upon itself so as to define an interior cavity between opposing folds of said fabric, the interior cavity including said flexible band and a seal member for sealing engaging said support member opening, said fabric cuff and said polymer collar being joined together within said collar inner passage.

24. The filter bag of claim 23, wherein said polymer collar has a generally cylindrical configuration and said fabric cuff has a generally conical configuration.

25. The filter bag of claim 19, wherein said polymer collar has a generally cylindrical configuration and said fabric cuff has a generally conical configuration.

* * * * *